(12) United States Patent
Jang et al.

(10) Patent No.: US 9,081,233 B2
(45) Date of Patent: Jul. 14, 2015

(54) POLARIZING LIQUID CRYSTAL PANEL, DISPLAY APPARATUS INCLUDING THE SAME AND METHOD OF MANUFACTURING THE SAME

(71) Applicant: SAMSUNG DISPLAY CO., LTD., Yongin, Gyeonggi-Do (KR)

(72) Inventors: Dae-Hwan Jang, Suwon-si (KR); Gug-Rae Jo, Asan-si (KR); Min-Uk Kim, Seongnam-si (KR); Hyun-Seok Kim, Anyang-si (KR); Sung-Hee Lee, Seoul (KR); Jae-Hyuk Chang, Seongnam-si (KR); Nam-Ok Jung, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 180 days.

(21) Appl. No.: 13/673,999

(22) Filed: Nov. 10, 2012

(65) Prior Publication Data

US 2013/0169915 A1 Jul. 4, 2013

(30) Foreign Application Priority Data

Jan. 4, 2012 (KR) ........................ 10-2012-0001224

(51) Int. Cl.
*G02F 1/1339* (2006.01)
*G02B 27/26* (2006.01)
*G02F 1/1343* (2006.01)

(52) U.S. Cl.
CPC .............. *G02F 1/1339* (2013.01); *G02B 27/26* (2013.01); *G02F 1/13392* (2013.01); *G02F 1/13394* (2013.01); *G02F 1/134309* (2013.01)

(58) Field of Classification Search
CPC .......... G02F 1/133345; G02F 1/13392; G02F 1/13394
USPC .................................................... 349/155, 157
See application file for complete search history.

(56) References Cited

U.S. PATENT DOCUMENTS

| 2006/0109414 A1* | 5/2006 | Liao et al. ...................... 349/158 |
| 2008/0030574 A1* | 2/2008 | Sun ................................. 348/58 |
| 2011/0085119 A1* | 4/2011 | Shiau ............................ 349/129 |
| 2011/0115984 A1* | 5/2011 | Tsubata ........................ 348/731 |

FOREIGN PATENT DOCUMENTS

| JP | 2004354939 A | 12/2004 |
| KR | 1020090048183 A | 5/2009 |

* cited by examiner

*Primary Examiner* — Nathanael R Briggs
(74) *Attorney, Agent, or Firm* — Cantor Colburn LLP (57) ABSTRACT

A polarizing liquid crystal panel includes a first substrate including a first base substrate, a first alignment layer, and a first electrode between the first base substrate and the first alignment layer, a second substrate including a second base substrate, a second alignment layer, and a second electrode between the second base substrate and the second alignment layer, the second substrate facing the first substrate, a spacer between the first and second substrates and maintaining a cell gap therebetween, and a liquid crystal flow preventing portion between the first and second substrates. The liquid crystal flow preventing portion extends in a first direction, and restricts movement of the spacer in a second direction substantially perpendicular to the first direction.

16 Claims, 8 Drawing Sheets

POLARIZING LIQUID CRYSTAL PANEL, DISPLAY APPARATUS INCLUDING THE SAME AND METHOD OF MANUFACTURING THE SAME

This application claims priority to Korean Patent Application No. 10-2012-0001224, filed on Jan. 4, 2012, and all the benefits accruing therefrom under 35 U.S.C. §119, the contents of which are herein incorporated by reference in their entireties.

BACKGROUND

1. Field

Exemplary embodiments of the invention relate to a polarizing liquid crystal panel, a display apparatus including the polarizing liquid crystal panel, and a method of manufacturing the polarizing liquid crystal panel. More particularly, exemplary embodiments of the invention relate to a polarizing liquid crystal panel preventing a gravity defect, a display apparatus including the polarizing liquid crystal panel, and a method of manufacturing the polarizing liquid crystal panel 2. Description of the Related Art Generally, a display apparatus displaying a stereoscopic image displays a three-dimensional ("3D") image using a binocular parallax between two eyes of an observer. The displaying of the stereoscopic image using the binocular parallax may be divided to a stereoscopic type display and an auto-stereoscopic type display.

An example of the stereoscopic type display may include a polarizing glass type display using polarizing glasses having different polarizing properties from each other corresponding to a left eye and a right eye of the observer. The polarizing glass type display may generally include a patterned retarder type display using a space division and an active retarder type display using a time division.

The active retarder type display includes an active switch panel ("ASP") as a polarizing panel converting a polarizing property of the stereoscopic image to generate a left eye image and a right eye image. The ASP may polarize a light using a liquid crystal.

Generally, the ASP includes two glass substrates as base substrates, and a spacer disposed therebetween to maintain a cell gap. For example, when the ASP is applied to a large display panel of a 3D display apparatus, a plastic substrate instead of the glass substrate and a bead spacer may be used to reduce a manufacturing cost. However, the bead spacer may affect the cell gap according to density thereof, and when the display panel including the bead spacer is placed in an erect position, a liquid crystal within the display panel is condensed in a direction of gravity. Accordingly, a gravity defect may occur in the display panel.

SUMMARY

One or more exemplary embodiments of the invention provide a polarizing liquid crystal panel having a stable structure to reduce or effectively prevent a gravity defect and reduce manufacturing costs.

One or more exemplary embodiments of the invention also provide a display apparatus including the polarizing liquid crystal panel.

One or more exemplary embodiments of the invention also provide a method of manufacturing the polarizing liquid crystal panel.

According to an exemplary embodiment, a polarizing liquid crystal panel includes a first substrate including a first base substrate, a first alignment layer, and a first electrode between the first base substrate and the first alignment layer, a second substrate including a second base substrate, a second alignment layer, and a second electrode between the second base substrate and the second alignment layer, the second substrate facing the first substrate, a spacer between the first and second substrates and maintaining a cell gap between the first and second substrates, and a liquid crystal flow preventing portion between the first and second substrates. The liquid crystal flow preventing portion extends in a first direction, and restricts movement of the spacer in a second direction substantially perpendicular to the first direction.

In an exemplary embodiment, the first base substrate or the second base substrate may be a plastic substrate.

In an exemplary embodiment, the first substrate or the second substrate includes the liquid crystal flow preventing portion.

In an exemplary embodiment, the polarizing liquid crystal panel may further include a plurality of the liquid crystal flow preventing portions which are arranged in the second direction. Adjacent liquid crystal flow preventing portions are spaced apart from each other by a distance in the second direction, and ending portions of the adjacent liquid crystal flow preventing portions overlap with each other at a center area of the polarizing liquid crystal panel.

In an exemplary embodiment, the second electrode may be a segment electrode, and the segment electrode may be a unit of driving the polarizing liquid crystal panel.

In an exemplary embodiment, the polarizing liquid crystal panel may further include a plurality of segment electrodes, and the liquid crystal flow preventing portion may be between adjacent segment electrodes.

In an exemplary embodiment, a height of the liquid crystal flow preventing portion is substantially the same as the cell gap between the first and second substrates.

In an exemplary embodiment, a height of the liquid crystal flow preventing portion is smaller than the cell gap between the first and second substrates.

In an exemplary embodiment, the liquid crystal flow preventing portion may further include a first flow preventing portion on the first substrate and spaced apart from the second substrate, and a second flow preventing portion on the second substrate and spaced apart from the first substrate.

In an exemplary embodiment, the polarizing liquid crystal panel may further include a plurality of second flow preventing portions. The first flow preventing portion is between adjacent second liquid crystal flow preventing portions.

In an exemplary embodiment, the first electrode or the second electrode may include a patterned electrode, the patterned electrode including a plurality of sub-electrodes.

In an exemplary embodiment, the first electrode may be a patternless electrode on an entire of the first substrate, and the second electrode may be a patterned electrode including a plurality of sub-electrodes.

In an exemplary embodiment, the plastic substrate may include at least one selected from the group consisting of polycarbonate ("PC"), triacetiyl cellulose ("TAC") and cyclic olefin copolymer ("COC").

According to another exemplary embodiment, a display apparatus includes a display panel displaying a stereoscopic image, and a polarizing liquid crystal panel on the display panel. The polarizing liquid crystal panel includes a first substrate including a first base substrate, a first alignment layer, and a first electrode between the first base substrate and the first alignment layer, a second substrate including a second base substrate, a second alignment layer, and a second electrode between the second base substrate and the second alignment layer, the second substrate facing the first substrate, a spacer between the first and second substrates and maintaining a cell gap between the first and second substrates, and a liquid crystal flow preventing portion between the first and second substrates. The liquid crystal flow preventing portion extends in a first direction, and restricts movement of the spacer in a second direction substantially perpendicular to the first direction.

In an exemplary embodiment, the first substrate may be between the display panel and the second substrate, and the second substrate may further include a moisture resistant layer including an organic material.

In an exemplary embodiment, the display apparatus may further include polarizing glasses which receive an image which is passed through the polarizing liquid crystal panel, the polarizing glasses including a left eye part and a right eye part having different polarizing properties from each other.

According to still another exemplary embodiment, a method of manufacturing a polarizing liquid crystal panel includes forming a first substrate including a first base substrate, a first alignment layer, and a first electrode between the first base substrate and the first alignment layer, forming a first liquid crystal flow preventing portion on the first substrate, the liquid crystal flow preventing portion extending in a first direction, forming a spacer on the first substrate, and combining the first substrate and a second substrate, the second substrate including a second base substrate, a second alignment layer, and a second electrode between the second base substrate and the second alignment layer, the second substrate facing the first substrate.

In an exemplary embodiment, the method may further include forming a plurality of first liquid crystal flow preventing portions on the first substrate and forming a second liquid crystal flow preventing portion on the second substrate, the second liquid crystal flow preventing portion extending in the first direction. The second liquid crystal flow preventing portion is spaced apart from an adjacent first liquid crystal flow preventing portion, and is between adjacent first liquid crystal flow preventing portions.

In an exemplary embodiment, the forming the first liquid crystal flow preventing portion may include forming a gravure pattern corresponding to a structure of the first liquid crystal flow preventing portion, on a printing plate, filling an ink in the gravure pattern on the printing plate, transferring the ink filled in the gravure pattern to a blanket of an ink roller, and retransferring the ink transferred to the ink roller to the first base substrate including the first alignment layer formed thereon.

In an exemplary embodiment, the forming the first liquid crystal flow preventing portion may further include forming a bead gravure pattern corresponding to a location of the spacer, between adjacent gravure patterns on the printing plate, filling a beads ink in the bead gravure pattern on the printing plate, transferring the ink and the beads ink filled in the gravure pattern and the bead gravure pattern respectively to the blanket of the ink roller, and retransferring the ink and the beads ink transferred to the ink roller to the first base substrate including the first alignment layer formed thereon.

According to one or more of the exemplary embodiments, a polarizing liquid crystal panel includes a liquid crystal flow preventing portion having a dam structure, so that the liquid crystal flow preventing portion restricts movement of a liquid crystal between the first and second substrates from flowing in a direction of gravity.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

Figure 1:
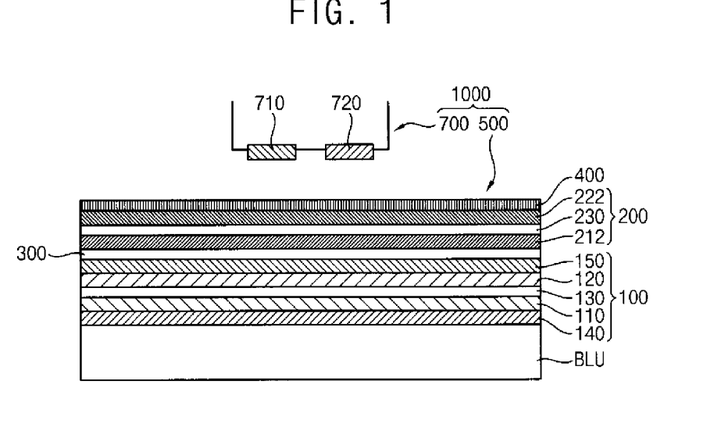
FIG. 1 is a cross-sectional view illustrating an exemplary embodiment of a display apparatus.

FIG. 1 is a cross-sectional view illustrating an exemplary embodiment of a display apparatus.

Referring to FIG. 1, a display apparatus 1000 includes a display part 500 and a polarizing glasses part 700. The display part 500 displays a two-dimensional ("2D") image or a three-dimensional ("3D") image, and a viewer may stereoscopically recognize the 3D image through the polarizing glasses part 700 when the display part 500 displays the 3D image.

The display part 500 includes a display panel 100 substantially displaying the 2D image or the 3D image, and a polarizing liquid crystal panel 200 polarizing a light passing through the display panel 100. The display part 500 may further include an adhesive member 300 combining the display panel 100 with the polarizing liquid crystal panel 200, and a phase retardation member 400. In addition, the display part 500 may further include a backlight assembly BLU providing a light to the display panel 100. The backlight assembly BLU is disposed under the display panel 100.

The display panel 100 includes a first display substrate 110, a second display substrate 120 and a display element layer 130. The display panel 100 further includes a first polarizing member 140 and a second polarizing member 150.

The first display substrate 110 may include a plurality of pixel electrodes arranged in a matrix shape in a plan view. The pixel electrodes may be on a glass substrate as a base substrate of the first display substrate 110. The first display substrate 110 may include signal lines on the glass substrate and connected to the pixel electrodes, and a lower alignment layer on the glass substrate including the pixel electrodes thereon.

The second display substrate 120 faces the first display substrate 110 and includes a common electrode forming an electric field in the display element 130 with the pixel electrodes. The common electrode may be on a glass substrate as a base substrate of the second display substrate 120. The second display substrate 120 may include an upper alignment layer on the glass substrate including the common electrode thereon. The second display substrate 120 may include a color filter layer representing colors. Alternatively, the first display substrate 110 may include the color filter layer.

The display element layer 130 is interposed between the first and second display substrate 110 and 120. The display element layer 130 may include a plurality of liquid crystal molecules. The liquid crystal molecules control a transmittance of the light provided from the backlight assembly BLU by the electric field in the display element 130 to display an image.

The first polarizing member 140 is on the first display substrate 110. The first polarizing member 140 is on the base substrate including the pixel electrodes thereon. When the pixel electrodes are on a first surface of the base substrate of the first display substrate 110, the first polarizing member 140 is on a second surface opposite to the first surface of the base substrate of the first display substrate 110. The second polarizing member 150 is on the second display substrate 120. The second polarizing member 150 is on the base substrate including the common electrode thereon. When the common electrode is on a first surface of the base substrate of the second display substrate 120, the second polarizing member 150 is on a second surface opposite to the first surface of the base substrate of the second display substrate 120. A polarizing axis of the second polarizing member 150 may be perpendicular to or parallel with a polarizing axis of the first polarizing member 140.

The polarizing liquid crystal panel 200 includes a first substrate 212 as a lower substrate, a second substrate 222 as an upper substrate, and a liquid crystal layer 230. The polarizing liquid crystal panel 200 will be illustrated in detail, referring to FIG. 2.

The adhesive member 300 is disposed between the display panel 100 and the polarizing liquid crystal panel 200 to combine the display panel 100 with the polarizing liquid crystal panel 200.

The phase retardation member 400 is disposed on a viewing side of the polarizing liquid crystal panel 200. The phase retardation member 400 is disposed directly on the second substrate 222. The phase retardation member 400 may circularly-polarize a light passing through the polarizing liquid crystal panel 200. In one exemplary embodiment, for example, when a linearly polarized light passes through the phase retardation member 400, the linearly polarized light may be polarized to be a circular polarized light. In one exemplary embodiment, for example, the phase retardation member 400 may be a quarter wave length plate.

The polarizing glasses part 700 may include a right eye portion 710, and a left eye portion 720 having a polarizing property different from the right eye portion 710. A first polarized light passing through the polarizing liquid crystal panel 200 and the phase retardation member 400 may be provided to a right eye of a viewer via the right eye portion 710. In addition, a second polarized light passing through the polarizing liquid crystal panel 200 and the phase retardation member 400 may be provided to a left eye of the viewer via the left eye portion 720. The first polarized light may be a first circular polarized light formed by circularly-polarizing a first linearly polarized light provided from the polarizing liquid crystal panel 200 and passing through the phase retardation member 400. The second polarized light may be a second circular polarized light formed by circularly-polarizing a second linearly polarized light provided from the polarizing liquid crystal panel 200 and passing the phase retardation member 400. Thus, the viewer may stereoscopically recognize the 3D image through the display apparatus 1000.

In FIG. 1, the display panel 100 includes the display element layer 130 and the display apparatus 1000 includes the backlight assembly BLU. Alternatively, a display panel 100 disposed under the polarizing liquid crystal panel 200 may include an electric luminance element and the backlight assembly BLU may be omitted.

Hereinafter, an exemplary embodiment of a structure of the polarizing liquid crystal panel 200 shown in FIG. 1 will be illustrated in detail, referring to FIG. 2.

Figure 2:
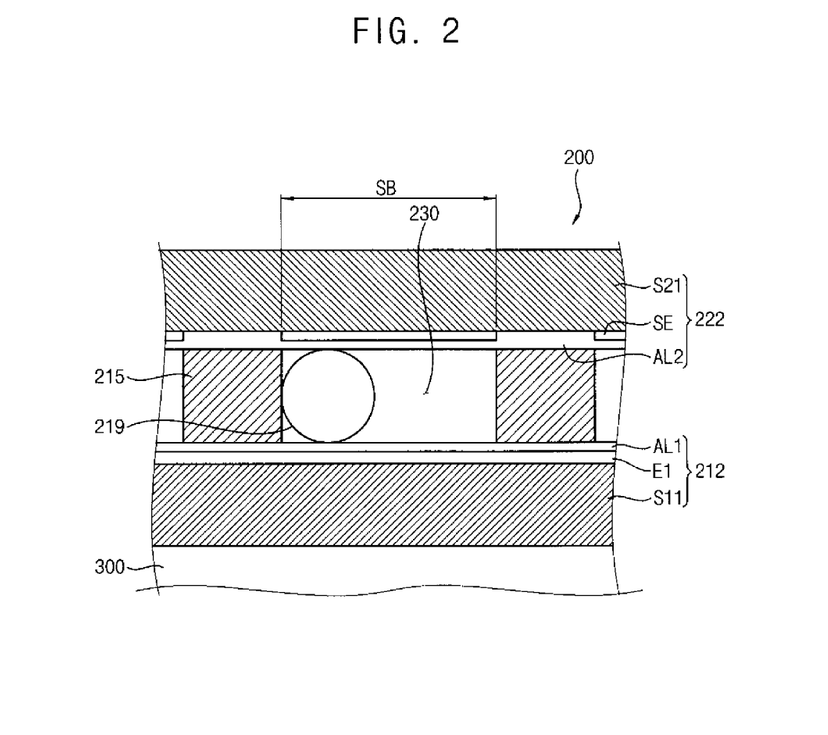
FIG. 2 is an enlarged cross-sectional view illustrating an exemplary embodiment of a polarizing liquid crystal panel of FIG. 1.

FIG. 2 is an enlarged cross-sectional view illustrating an exemplary embodiment of a polarizing liquid crystal panel of FIG. 1

Referring to FIGS. 1 and 2, the first substrate 212 includes a first base substrate S11, a first electrode E1, a first alignment layer AL1 a liquid crystal flow preventing portion 215 and a spacer 219.

The first base substrate S11 may include a plastic substrate. The plastic substrate is transparent, lighter than a glass substrate, and cheaper than the glass substrate. A material of the plastic substrate may include, but is not limited to, polycarbonate ("PC"), triacetyl cellulose ("TAC") or cyclic olefin copolymer ("COC"), etc.

The first electrode E1 may be directly on the first base substrate S11. The first electrode E1 may include transparent and conductive material such as indium zinc oxide, indium tin oxide, etc. The first electrode E1 is a patternless electrode on and overlapping an entire of the first base substrate S11. The patternless electrode is a single, unitary, indivisible electrode layer on the first base substrate S11 excluding patterns thereon or therein. Since the first electrode E1 is the patternless electrode, damage to the first base substrate S11 in patterning a layer thereon may be reduced or effectively prevented and the first electrode E1 may be stably formed on the plastic first base substrate S11 via a continuous roll-to-roll manufacturing process.

The first alignment layer AL1 is on the first base substrate S11 including the first electrode E1 thereon. The first alignment layer AL1 is on and overlapping an entire of the first base substrate S11.

The liquid crystal flow preventing portion 215 is on the first base substrate S11 including the first alignment layer AL1 thereon. In one exemplary embodiment, for example, the liquid crystal flow preventing portion 215 is configured to have dam structure which includes a longitudinal axis extending in a first direction d1 (refer to FIGS. 3A and 3B). The polarizing liquid crystal panel 200 may include a plurality of liquid crystal flow preventing portions 215 arranged in a second direction d2 substantially perpendicular to the first direction d1 to have a certain distance between adjacent liquid crystal flow preventing portions 215. The distance between adjacent liquid crystal flow preventing portions 215 may be constant, but the exemplary embodiment is not limited thereto or thereby.

A height of the liquid crystal flow preventing portion 215 and a height of the spacer 219 taken in the cross-section or perpendicular to the first base substrate S11, are substantially the same. Accordingly, the liquid crystal flow preventing portion 215 supports the spacer 219 between the first and second substrates 212 and 222. The liquid crystal flow preventing portion 215 prevents flowing of the liquid crystal between the first and second substrates 212 and 222 in a direction of gravity, for example, in a +d2 or −d2 direction depending how the display apparatus 1000 is oriented. The liquid crystal flow preventing portion 215 maintains a cell gap between the first and second substrates 212 and 222.

Figure 3A:
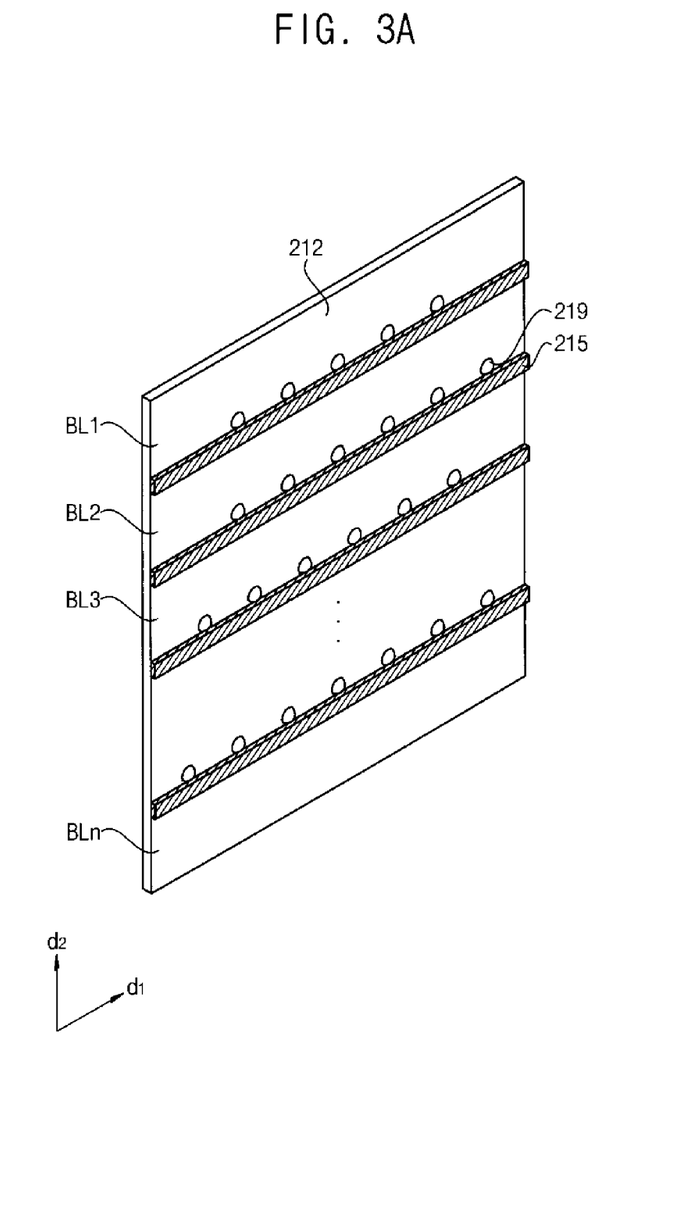
FIGS. 3A and 3B are perspective views schematically showing exemplary embodiments of a liquid crystal flow preventing portion of FIG. 2.
Figure 3B:
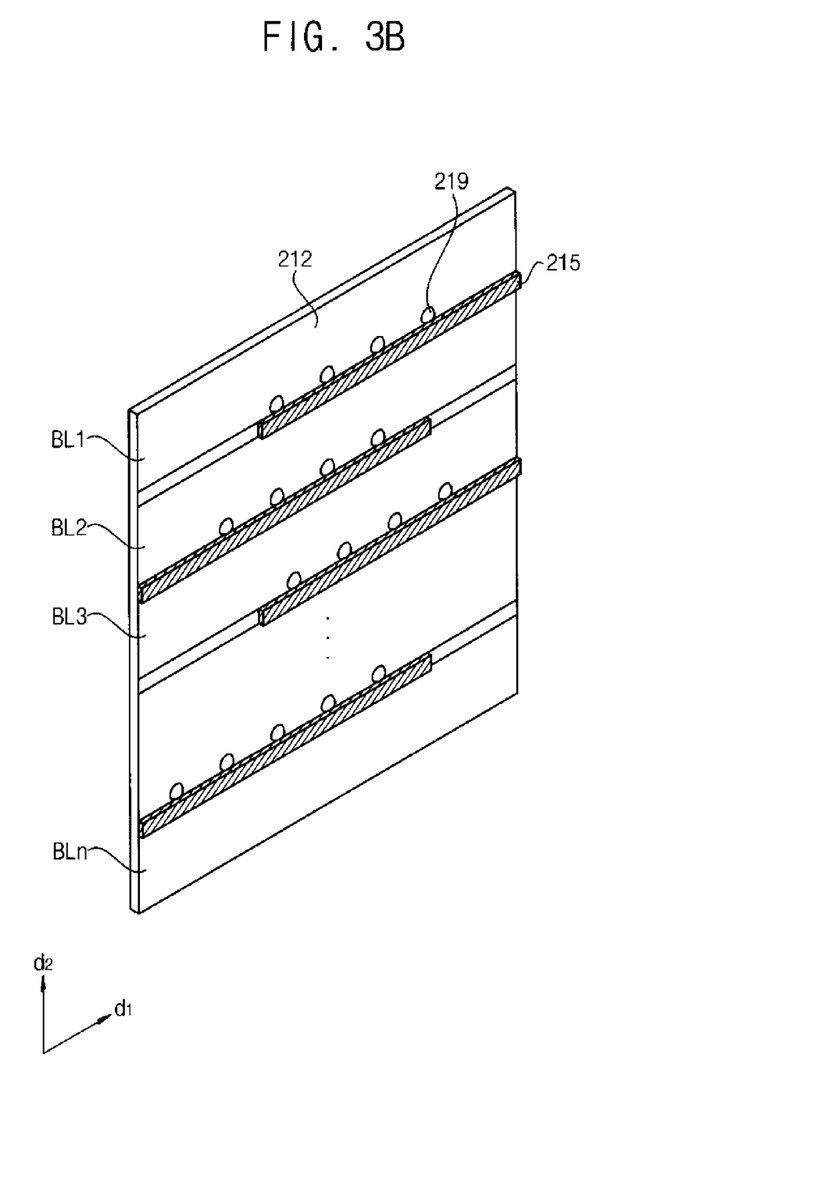

FIGS. 3A and 3B are perspective views schematically showing exemplary embodiments of a liquid crystal flow preventing portion of FIG. 2.

Referring to FIGS. 2 and 3A, the longitudinal axis of the liquid crystal flow preventing portions 215 extends in the first direction d1, and the liquid crystal flow preventing portions 215 are arranged in the second direction d2 to have a certain distance between adjacent liquid crystal flow preventing portions 215. Each of the liquid crystal flow preventing portions 215 is extended an entire length of the first substrate 212 in the first direction d1 and end portions of the liquid crystal flow preventing portions 215 are aligned with end portions of the first substrate 212, but the exemplary embodiment is not limited thereto or thereby.

A plurality of blocks BL1 to BLn on the first substrate 212 is arranged in the second direction d2. In one exemplary embodiment, for example, a liquid crystal flow preventing portion 215 is disposed between two blocks adjacent to each other of the plurality of blocks BL1 to BLn. The liquid crystal flow preventing portion 215 supports the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 200. In other words, the liquid crystal flow preventing portion 215 is disposed between segment electrodes SE, for example, is disposed on an area excluding the segment electrodes SE. Accordingly, a loss of transmittance of the polarizing liquid crystal panel 200 may be minimized.

Referring to FIGS. 2 and 3B, the longitudinal axis of the liquid crystal flow preventing portions 215 extends in the first direction d1, and the liquid crystal flow preventing portions 215 are arranged in the second direction d2 to have a certain distance between adjacent liquid crystal flow preventing portions 215. Each of the liquid crystal flow preventing portions 215 is extended less than an entire length of the first substrate 212 in the first direction d1 and only one end portion of each liquid crystal flow preventing portion 215 is aligned with a corresponding end portion of the first substrate 212, but the exemplary embodiment is not limited thereto or thereby.

In FIG. 3B, for example, a first end portion may be to the left in the first direction d1, while a second end portion opposite to the first end portion is to the right in the first direction d1. As illustrated in FIG. 3B, a first end portion of a liquid crystal flow preventing portion 215 is adjacent to a second end portion of an adjacent liquid crystal flow preventing portion 215, and the first and second portions are overlapped at a center area of the polarizing liquid crystal panel 200, where the center area is taken with respect to the first direction d1. The plurality of liquid crystal flow preventing portions 215 may alternate being left justified or right justified with respect to edges of the first substrate S212.

A plurality of blocks BL1 to BLn on the first substrate 212 is arranged in the second direction d2. In one exemplary embodiment, for example, a liquid crystal flow preventing portion 215 is disposed between two blocks adjacent to each other of the plurality of blocks BL1 to BLn. The liquid crystal flow preventing portion 215 supports the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 200. In other words, the liquid crystal flow preventing portion 215 is disposed between segment electrodes SE, for example, is disposed on an area excluding the segment electrodes SE. Accordingly, a loss of transmittance of the polarizing liquid crystal panel 200 may be minimized.

The spacer 219 is disposed between the first and second substrates 212 and 222. In one exemplary embodiment, for example, the spacer 219 may include a bead spacer, and maintains the cell gap between the first and second substrate 212 and 222.

The first electrode E1, the first alignment layer AL1 and the liquid crystal flow preventing portion 215 are disposed on a first surface of the first base substrate S11. The adhesive member 300 is disposed between a second surface of the first base substrate S11 opposite to the first surface thereof, and the display panel 100. Accordingly, the polarizing liquid crystal panel 200 and the display panel 100 may be adhered to each other.

The second substrate 222 includes a second base substrate S21, a segment electrode SE and a second alignment layer AL2. The segment electrode SE and the second alignment layer AL2 are on a first surface of the second base substrate S21.

The second base substrate S21 may include a plastic substrate. The second base substrate S21 may further include an additional moisture resistant layer (not shown) to reduce or effectively prevent the moisture from flowing into the liquid crystal layer 230 from outside the display apparatus 1000.

The moisture resistant layer is on a second surface opposing the first surface of the second base substrate S21. Since the second base substrate S21 is the plastic substrate having a weak resistance to the moisture, the moisture resistant layer may reduce or effectively prevent the moisture from flowing into the liquid crystal layer 230 after passing through the second base substrate S21. The moisture resistant layer may include an organic material which is cheaper than an inorganic material.

The segment electrode SE may be directly on the second base substrate S21. The segment electrode SE may include substantially the same material as the first electrode E1. The segment electrode SE is a patterned electrode including a plurality of sub-electrodes spaced apart from each other. The sub-electrodes correspond to the segment blocks SB1 to SBn, respectively. A driving signal to drive the segment blocks SB1 to SBn may be sequentially applied to the segment blocks SB1 to SBn to drive the polarizing liquid crystal panel 200 in a first polarizing mode in which a first polarized light is emitted, and to drive the polarizing liquid crystal panel 200 in a second polarizing mode in which a second polarized light is emitted.

The second alignment layer AL2 is on the second base substrate S21 including the segment electrode SE thereon. The second alignment layer AL2 is on and overlapping an entire of the second base substrate S21. The second alignment layer AL2 may align the liquid molecules of the liquid crystal layer 230 in cooperation with the first alignment layer AL1.

The segment electrode SE and the second alignment layer AL2 are on the first surface of the second base substrate S21, and the second surface opposite to the first surface of the second base substrate S21 is disposed toward the viewing side of the polarizing liquid crystal panel 200 and an outer portion of the display part 500. The phase retardation member 400 is disposed on the second surface of the second base substrate S21.

According to the exemplary embodiment, the liquid crystal flow preventing portion 215 is on a first base substrate S11 including the first alignment layer AU thereon, however a position of the liquid crystal flow preventing portion 215 is not limited thereto. In one exemplary embodiment, for example, the liquid crystal flow preventing portion 215 may be on the second base substrate S21 including the second alignment layer AL2 thereon. In addition, according to the exemplary embodiment, the first electrode E1 is the patternless electrode and the segment electrode SE is the patterned electrode including a plurality of sub-electrodes, however, the first electrode E1 and the segment electrode SE are not limited thereto. In one exemplary embodiment, for example, the first electrode E1 may be a patterned electrode and the segment electrode SE may be a patternless electrode.

According to the exemplary embodiment, the polarizing liquid crystal panel 200 includes the liquid crystal flow preventing portion 215, so that the liquid crystal flow preventing portion 215 supports the spacer 219 between the first and second substrate 212 and 222, and maintains the cell gap between the first and second substrate 212 and 222. Accordingly, the liquid crystal flow preventing portion 215 prevents the liquid crystal between the first and second substrates 212 and 222 from flowing in a direction of gravity.

FIGS. 4A to FIG. 4E are cross-sectional views illustrating an exemplary embodiment of a method of manufacturing the polarizing liquid crystal panel of FIG. 2.

Figure 4A:
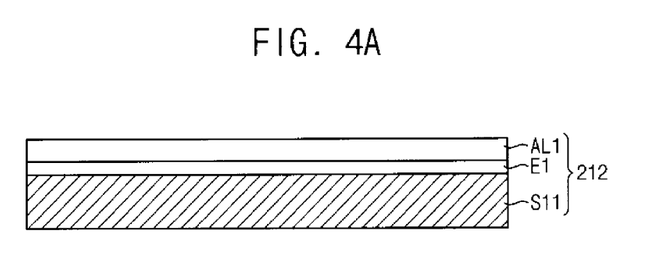
FIGS. 4A to FIG. 4E are cross-sectional views illustrating an exemplary embodiment of a method of manufacturing the polarizing liquid crystal panel of FIG. 2.

Referring to FIGS. 2 and 4A, the first base substrate S11 is prepared. The first base substrate S11 may include a plastic substrate. The plastic first base substrate S11 is transparent, lighter than a glass substrate and cheaper than the glass substrate. A material of the plastic first base substrate S11 may include, but is not limited to, PC, TAC or COC, etc.

The first electrode E1 is formed directly on the first base substrate S11. The first electrode E1 may be formed from transparent and conductive material such as indium zinc oxide, indium tin oxide, etc. The first electrode E1 is a patternless electrode formed on an entire of the first base substrate S11. The patternless electrode is an electrode layer formed on the first base substrate S11 excluding patterns formed thereon or therein. Since the first electrode E1 is the patternless electrode, damage to the first base substrate S11 in patterning a layer thereon may be reduced or effectively prevented and the first electrode E1 may be stably formed on the plastic first base substrate S11 via a continuous roll-to-roll manufacturing process.

The first alignment layer AL1 is formed on the first base substrate S11 including the first electrode E1 formed thereon. The first alignment layer AL1 is formed on an entire of the first base substrate S11.

The liquid crystal flow preventing portion 215 may be formed using a method of gravure printing. Hereinafter, a method of forming the liquid crystal flow preventing portion 215 will be explained with respect to FIGS. 4B to FIG. 4E.

Figure 4B:
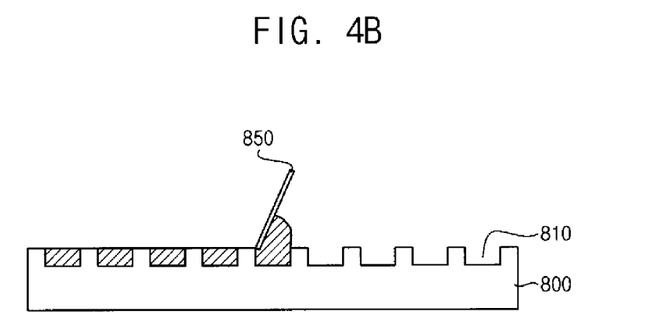

Referring to FIGS. 2 and 4B, a printing plate 800 on which gravure patterns 810 corresponding to a structure of the liquid crystal flow preventing portion 215 is formed, is prepared. In one exemplary embodiment, for example, the printing plate 800 may correspond to structures of the liquid crystal flow preventing portion 215 shown in FIGS. 3A and 3B. According to a doctoring process, an ink is deposited on the printing plate 800, and a surface of the printing plate 800 on which the ink is deposited, is shaved along one direction using a doctor blade 850. Accordingly, the ink is filled in only an area on which the gravure pattern 810 is formed. The ink includes a transparent material.

Figure 4C:
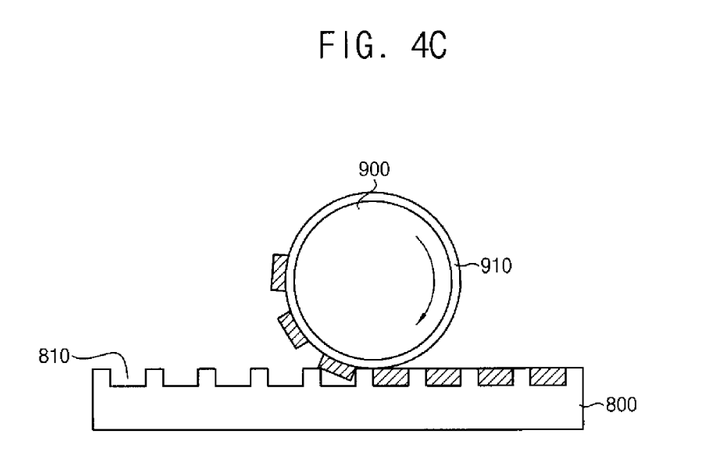

Referring to FIGS. 2 and 4C, the ink filled in the gravure pattern 810 is transferred to a blanket 910 of an ink roller 900 according to a gravure-off process.

Figure 4D:
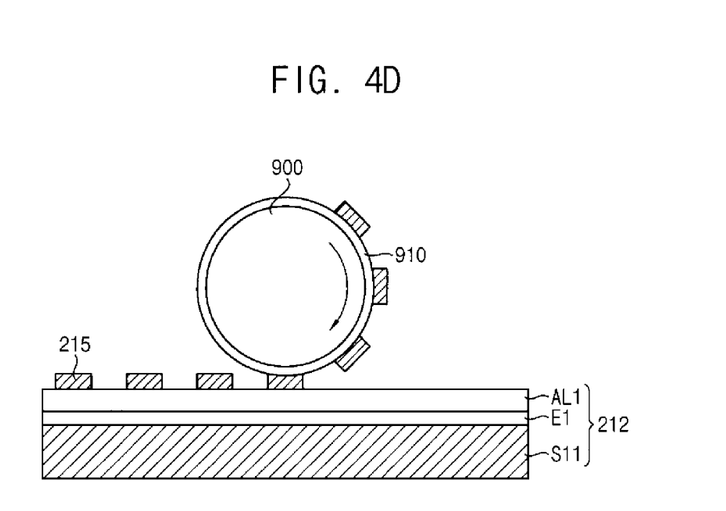

Referring to FIGS. 2 and 4D, the liquid crystal flow preventing portion 215 is formed on the first base substrate S11 including the first alignment layer formed thereon, using the ink roller 900 on which the ink was previously transferred. Accordingly, the liquid crystal flow preventing portions 215 are configured to have a dam structure which includes a longitudinal axis extending in a first direction d1, and arranged in the second direction d2 to have a certain distance between adjacent liquid crystal flow preventing portions 215.

Figure 4E:
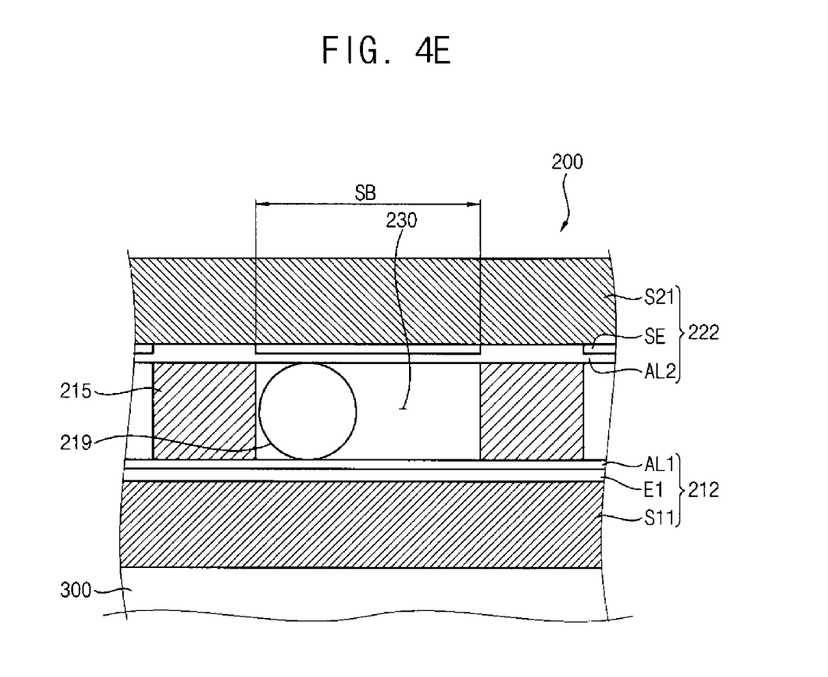

Referring to FIGS. 2 and 4E, the second substrate 222 is formed. A method of forming the second substrate 222 is substantially same as the method of forming the first substrate 212 except for forming the liquid crystal flow preventing portions 215. Accordingly, any further repetitive explanation concerning the method of forming the second substrate 222 will be omitted.

The spacer 219 is disposed between the first and second substrates 212 and 222, and a liquid crystal is formed between the first and second substrates 212 and 222. Accordingly, the polarizing liquid crystal panel 200 is formed. The spacer 219 and the liquid crystal flow preventing portion 215 may be formed at the same time. In one exemplary embodiment, for example, the spacer 219 and the liquid crystal flow preventing portion 215 may be formed, using a printing plate on which gravure patterns 810 corresponding to structures of both the spacer 219 and the liquid crystal flow preventing portion 215 is formed. And then, the ink is formed in the gravure patterns 810 corresponding to the liquid crystal flow preventing portion 215, and a beads ink is formed in the gravure patterns 810 corresponding to the spacer 219. The ink and the beads ink filled in the gravure pattern 810 are transferred to a blanket 910 of the ink roller 900 according to a gravure-off process. Accordingly, the spacer 219 and the liquid crystal flow preventing portion 215 may be formed at the same time using the ink roller 900 on which the ink and the beads ink are previously transferred.

The spacer 219 is formed using a method of gravure printing. Accordingly, the cell gap between the first and second substrates 212 and 222 is uniformly maintained. Since the spacer 219 is formed using a method of gravure printing, a density of the spacer 219 does not affect the cell gap and deterioration of brightness and contrast due to condensation of the spacer in a direction of gravity may be reduced or effectively prevented. In addition, the spacer 219 and the liquid crystal flow preventing portion 215 may be formed at the same time, so that manufacturing costs may be decreased.

Figure 5:
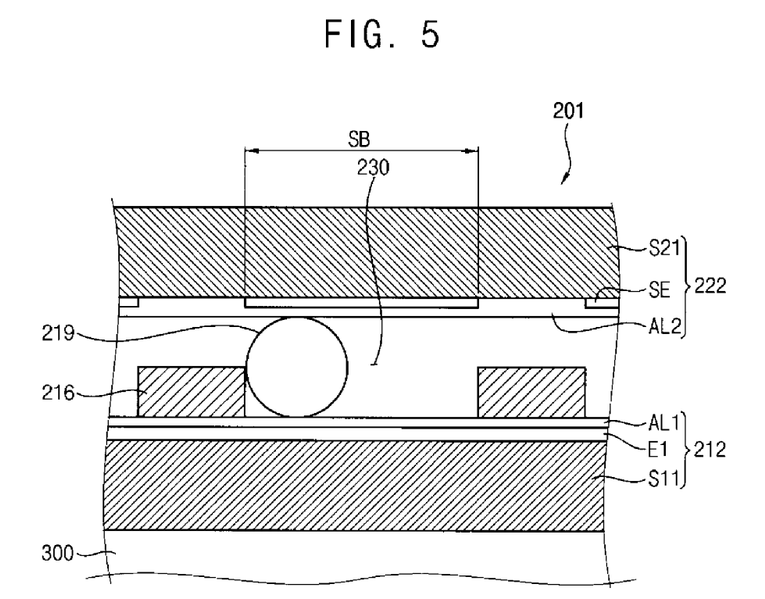
FIG. 5 is a cross-sectional view illustrating another exemplary embodiment of a display apparatus.

FIG. 5 is a cross-sectional view illustrating another exemplary embodiment of a display apparatus.

An exemplary embodiment of a display apparatus including a polarizing liquid crystal panel 201 shown in FIG. 5 is substantially the same as the display apparatus 1000 of FIGS. 1 and 2 except for the polarizing liquid crystal panel 201. Accordingly, the same reference numerals will be used to refer to the same or like parts as the display apparatus illustrated in FIGS. 1 and 2 and any further repetitive explanation concerning the same or like parts will be omitted.

Referring to FIGS. 1 and 5, the liquid crystal flow preventing portion 216 is on the first base substrate S11 including the first alignment layer AL1 thereon. In one exemplary embodiment, for example, the liquid crystal flow preventing portion 216 is configured to have dam structure which includes a longitudinal axis extending in the first direction d1. The polarizing liquid crystal panel 201 may include a plurality of liquid crystal flow preventing portions 216 arranged in the second direction d2 to have a certain distance between adjacent liquid crystal flow preventing portions 216. A height of the liquid crystal flow preventing portion 216 is smaller than a height of the spacer 219, where the heights are taken in the cross-section or perpendicular to the first base substrate S11. A space between the liquid crystal flow preventing portion 216 and the second substrate 222 is less than the height of the spacer 219. Accordingly, when the polarizing liquid crystal panel 201 is applied to a flexible display apparatus, the display apparatus may be suitable for bending because the liquid crystal flow preventing portion 216 generates a space with the second substrate 222, which enables bending of the display apparatus. In addition, the liquid crystal flow preventing portion 216 supports the spacer 219. Accordingly, the liquid crystal flow preventing portion 216 prevents pressing of the spacer 219 when the display apparatus is bent.

Referring to FIGS. 5 and 3A, the longitudinal axis of the liquid crystal flow preventing portions 216 extends in the first direction d1, and the liquid crystal flow preventing portions 216 are arranged in the second direction d2 to have a certain distance between adjacent liquid crystal flow preventing portions 216. In one exemplary embodiment, for example, a liquid crystal flow preventing portion 216 is disposed between two blocks adjacent to each other of a plurality of blocks BL1 to BLn. The plurality of blocks BL1 to BLn is arranged in the second direction d2. The liquid crystal flow preventing portion 216 supports the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 201. In other words, the liquid crystal flow preventing portion 216 is disposed between segment electrodes SE, for example, is disposed on an area excluding the segment electrodes SE. Accordingly, a loss of transmittance of the polarizing liquid crystal panel 201 may be minimized.

Referring to FIGS. 5 and 3B, the longitudinal axis of the liquid crystal flow preventing portions 216 extends in the first direction d1, and the liquid crystal flow preventing portions 216 are arranged in the second direction d2 to have a certain distance between adjacent liquid crystal flow preventing portions 216.

End portions of the liquid crystal flow preventing portions 216 adjacent to each other are overlapped at a center area of the polarizing liquid crystal panel 201. In one exemplary embodiment, for example, the liquid crystal flow preventing portion 216 is disposed between two blocks adjacent to each other of the plurality of blocks BL1 to BLn. The liquid crystal flow preventing portion 216 supports the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 201. In other words, the liquid crystal flow preventing portion 216 is disposed between segment electrodes SE, for example, is disposed on an area excluding the segment electrodes SE. Accordingly, a loss of transmittance of the polarizing liquid crystal panel 201 may be minimized.

According to the exemplary embodiment, a method of forming the polarizing liquid crystal panel 201 is substantially same as the method of forming the polarizing liquid crystal panel 200 illustrated in FIGS. 4A to FIG. 4E. Accordingly, any further repetitive explanation concerning the method of forming the polarizing liquid crystal panel 201 will be omitted.

According to the exemplary embodiment, the polarizing liquid crystal panel 201 includes the liquid crystal flow preventing portion 216. Accordingly, when the polarizing liquid crystal panel including the spacer 219 is placed in an erect position, the liquid crystal flow preventing portion 216 supports the spacer 219 between the first and second substrate 212 and 222, and uniformly maintains the cell gap between the first and second substrate 212 and 222. Accordingly, the liquid crystal flow preventing portion 216 prevents the liquid crystal between the first and second substrates 212 and 222 from flowing in a direction of gravity. In addition, since the height of the liquid crystal flow preventing portion 216 is smaller than the height of the spacer 219, the liquid crystal flow preventing portion 216 prevents the spacer 219 from being pressed when the display apparatus including the polarizing liquid crystal panel 201 is bent.

Figure 6:
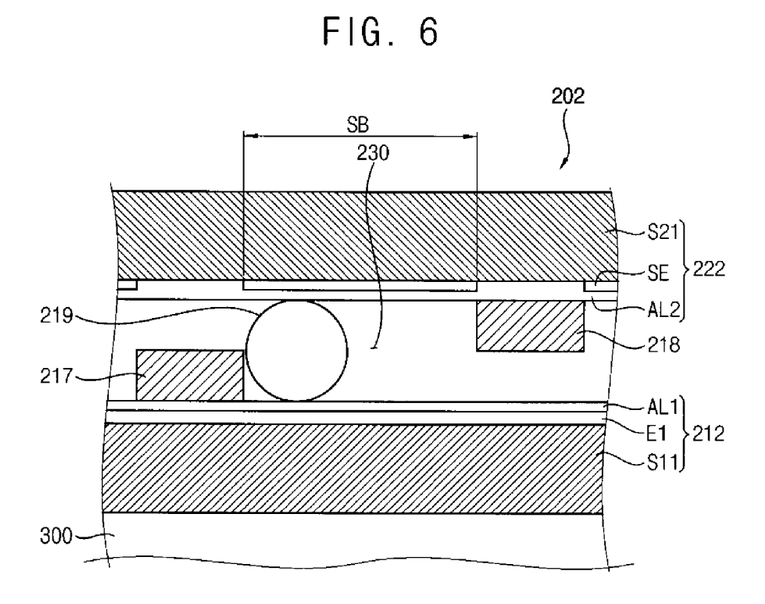
FIG. 6 is a cross-sectional view illustrating still another exemplary embodiment of a display apparatus.

FIG. 6 is a cross-sectional view illustrating still another exemplary embodiment of a display apparatus.

A display apparatus including a polarizing liquid crystal panel 202 shown in FIG. 6 is substantially the same as the display apparatus 1000 of FIGS. 1 and 2 except for the polarizing liquid crystal panel 202 including first and second liquid crystal flow preventing portions. Accordingly, the same reference numerals will be used to refer to the same or like parts as the display apparatus illustrated in FIGS. 1 and 2 and any further repetitive explanation concerning the same or like parts will be omitted.

Referring to FIGS. 1 and 6, a first liquid crystal flow preventing portion 217 is on the first base substrate S11 including the first alignment layer AL1 thereon. A second liquid crystal flow preventing portion 218 is on the second base substrate S21 including the second alignment layer AL2 thereon. In one exemplary embodiment, for example, each of the first and second liquid crystal flow preventing portions 217 and 218 is configured to have dam structure which includes a longitudinal axis extending in the first direction d1. The polarizing liquid crystal panel 202 may include a plurality of liquid crystal flow preventing portions 217 and 218 arranged in the second direction d2 to have a certain distance between adjacent first and second liquid crystal flow preventing portions 217 and 218. In other words, the first liquid crystal flow preventing portions 217 are between the second liquid crystal flow preventing portions 218, such that the first liquid crystal flow preventing portions 217 alternate with the second liquid crystal flow preventing portions 218 in the second direction d2.

A height of the first liquid crystal flow preventing portion 217 and a height of the second liquid crystal flow preventing portion 218 are smaller than a height of the spacer 219 where the heights are taken in the cross-section or perpendicular to the first base substrate S11. A space between the first liquid crystal flow preventing portion 217 and the second substrate 222 is less than the height of the spacer 219, and a space between the second liquid crystal flow preventing portion 218 and the first substrate 212 is less than the height of the spacer 219. In one exemplary embodiment, for example, the height of the first liquid crystal flow preventing portion 217 and the height of the second liquid crystal flow preventing portion 218 may be substantially same. Accordingly, when the polarizing liquid crystal panel 202 is applied to a flexible display apparatus, the display apparatus may be suitable for bending because each of the first and second liquid crystal flow preventing portions 217 and 218 generates a space with the second and first substrates 222 and 212, respectively, which enables bending of the display apparatus. In addition, the first and second liquid crystal flow preventing portion 217 and 218 support the spacer 219. Accordingly, the first and second liquid crystal flow preventing portions 217 and 218 prevent pressing of the spacer 219 when the display apparatus is bent.

Figure 7A:
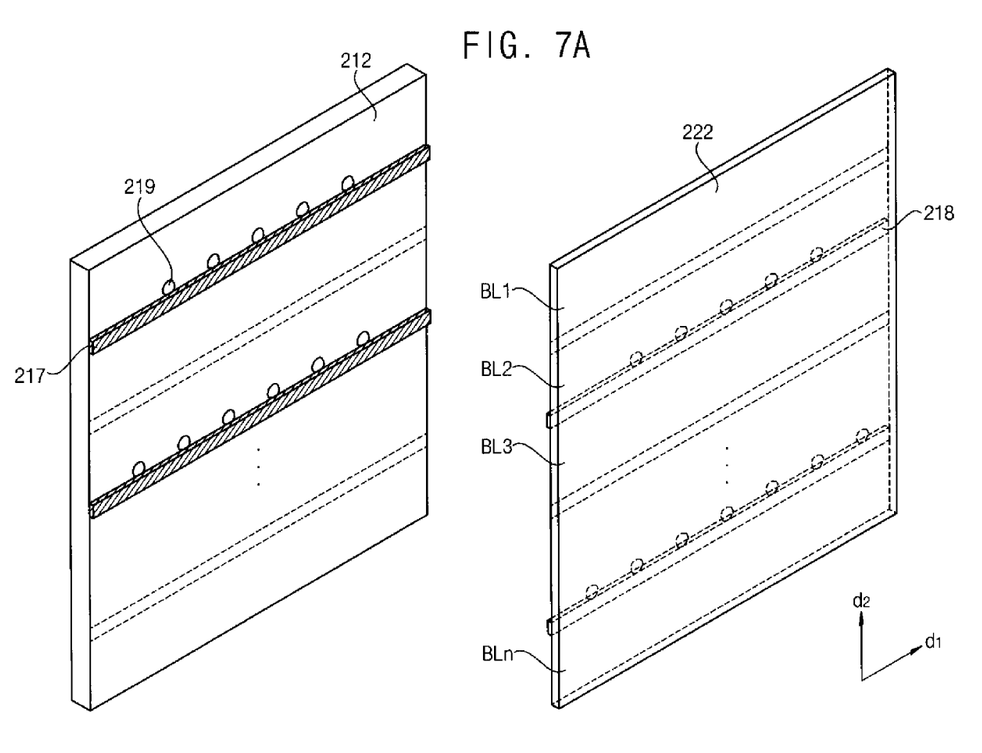
FIGS. 7A and 7B are perspective views schematically showing exemplary embodiments of a first liquid crystal flow preventing portion of FIG. 6.
Figure 7B:
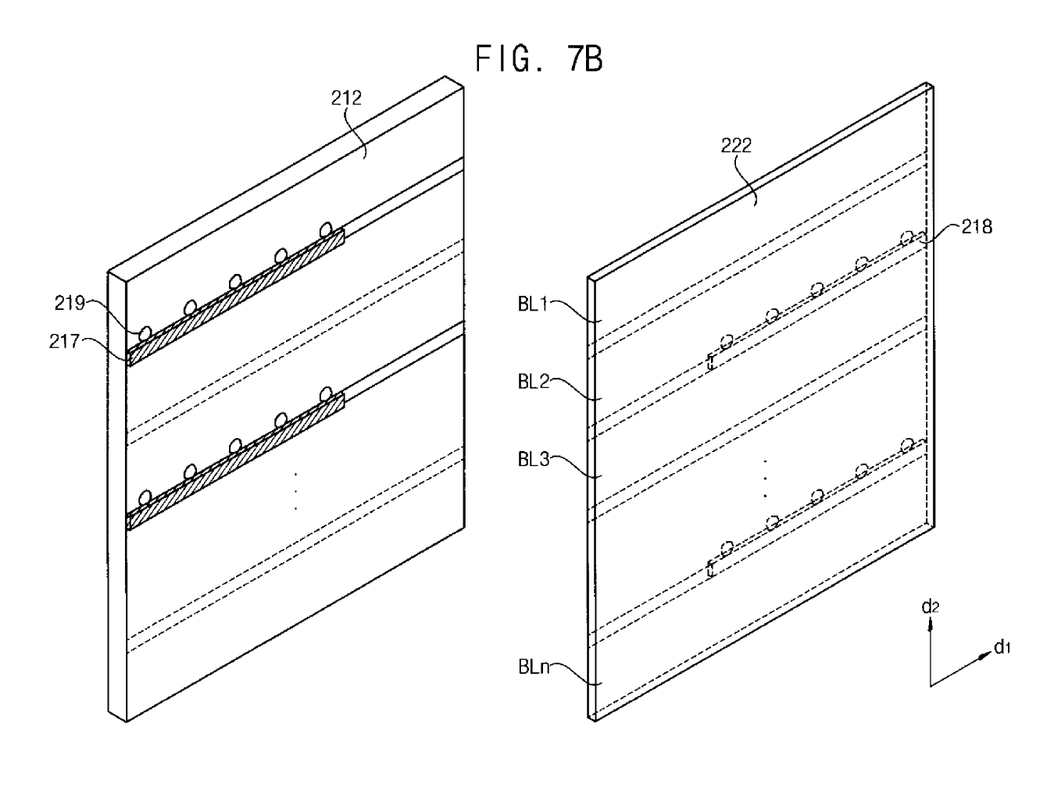

FIGS. 7A and 7B are perspective views schematically showing exemplary embodiments of a first liquid crystal flow preventing portion of FIG. 6.

Referring to FIGS. 6 and 7A, the first and second liquid crystal flow preventing portion 217 and 218 alternate when the first and second base substrates S11 and S21 are viewed in the plan view. The longitudinal axes of the first and second liquid crystal flow preventing portions 217 and 218 extend in the first direction d1, and the first and second liquid crystal flow preventing portions 217 and 218 are arranged in the second direction d2 to have a certain distance between adjacent first and second liquid crystal flow preventing portions 217 and 218. In other words, the first liquid crystal flow preventing portions 217 are between adjacent second liquid crystal flow preventing portions 218 in the second direction d2.

In one exemplary embodiment, for example, each of the first and second liquid crystal flow preventing portions 217 and 218 is disposed between two blocks adjacent to each other of a plurality of blocks BL1 to BLn. The plurality of blocks BL1 to BLn is arranged in the second direction d2. The first and second liquid crystal flow preventing portions 217 and 218 support the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 202. In other words, each of the first and second liquid crystal flow preventing portions 217 and 218 is disposed between segment electrodes SE, for example, is disposed on an area excluding the segment electrodes SE. Accordingly, a loss of transmittance of the polarizing liquid crystal panel 202 may be minimized.

Referring to FIGS. 6 and 7B, the first and second liquid crystal flow preventing portion 217 and 218 alternate when the first and second base substrates S11 and S21 are viewed in the plan view. The longitudinal axes of the first and second liquid crystal flow preventing portions 217 and 218 extend in the first direction d1, and the first and second liquid crystal flow preventing portions 217 and 218 are arranged in the second direction d2 to have a certain distance between adjacent first and second liquid crystal flow preventing portions 217 and 218. In other words, the first liquid crystal flow preventing portions 217 are between adjacent second liquid crystal flow preventing portions 218 in the second direction d2.

Each of the first and second liquid crystal flow preventing portions 217 and 218 has a first end portion, and a second end opposite to the first end portion. A second end portion of the first liquid crystal flow preventing portion 217 and a first end portion of the second liquid crystal flow preventing portion 218 are overlapped at a center area of the polarizing liquid crystal panel 202. In one exemplary embodiment, for example, each of the first and second liquid crystal flow preventing portions 217 and 218 is disposed between two blocks adjacent to each other of the plurality of blocks BL1 to BLn. The first and second liquid crystal flow preventing portions 217 and 218 support the spacer 219 on each of the blocks BL1 to BLn. In one exemplary embodiment, for example, the blocks BL1 to BLn may correspond to segment blocks SB1 to SBn respectively, as a unit of driving the polarizing liquid crystal panel 202. In other words, each of the first and second liquid crystal flow preventing portion 217 and 218 is disposed between segment electrodes SE, for example, is disposed on an area excluding the segment electrodes SE. Accordingly, a loss of transmittance of the polarizing liquid crystal panel 202 may be minimized.

According to the exemplary embodiment, a method of forming the polarizing liquid crystal panel 202 is substantially same as the method of forming the polarizing liquid crystal panel 200 illustrated in FIGS. 4A to FIG. 4E. Accordingly, any further repetitive explanation concerning the method of forming the polarizing liquid crystal panel 202 will be omitted.

According to the exemplary embodiment, the polarizing liquid crystal panel 202 includes the first liquid crystal flow preventing portion 217 on the first substrate 212 and the second liquid crystal flow preventing portion 218 on the second substrate 222. Accordingly, when the polarizing liquid crystal panel including the spacer 219 is placed in an erect position, the first and second liquid crystal flow preventing portion 217 and 218 support the spacer 219 between the first and second substrate 212 and 222, and uniformly maintain the cell gap between the first and second substrate 212 and 222. Accordingly, the first and second liquid crystal flow preventing portion 216 prevent the liquid crystal between the first and second substrates 212 and 222 from flowing in a direction of gravity. In addition, since the heights of the first and second liquid crystal flow preventing portions 217 and 218 are smaller than the height of the spacer 219, the first and second liquid crystal flow preventing portions 217 and 218 prevent the spacer 219 from being pressed when the display apparatus including the polarizing liquid crystal panel 202 is bent.

According to one or more exemplary embodiments, a polarizing liquid crystal panel includes a plastic substrate instead of a glass substrate, so that manufacturing costs may be decreased.

In addition, the polarizing liquid crystal panel includes a liquid crystal flow preventing portion having a dam structure, so that the liquid crystal flow preventing portion prevents a liquid crystal between the first and second substrates from flowing in a direction of gravity when a display apparatus including the polarizing liquid crystal panel is in an erect position.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A polarizing liquid crystal panel comprising:
a first substrate including a first base substrate, a first alignment layer, and a first electrode between the first base substrate and the first alignment layer;
a second substrate including a second base substrate, a second alignment layer, and a second electrode between the second base substrate and the second alignment layer, the second electrode defining a plurality of driving units of the polarizing liquid crystal panel, wherein the second substrate faces the first substrate;
a spacer between the first substrate and the second substrate, wherein the spacer maintains a cell gap between the first substrate and the second substrate; and
a liquid crystal flow preventing portion in the cell gap and between the first alignment layer and the second alignment layer,
wherein
the liquid crystal flow preventing portion is elongated in a first direction, and restricts movement of the spacer in a second direction which is substantially perpendicular to the first direction, and
the elongated liquid crystal flow preventing portion in the cell gap is disposed between adjacent driving units among the plurality of driving units of the polarizing liquid crystal panel.

2. The polarizing liquid crystal panel of claim 1, wherein at least one of the first and second base substrate is a plastic substrate.

3. The polarizing liquid crystal panel of claim 1, wherein the liquid crystal flow preventing portion is formed on at least one of the first and second substrate.

4. The polarizing liquid crystal panel of claim 1, further comprising a plurality of elongated liquid crystal flow preventing portions in the cell gap and arranged in the second direction,
wherein adjacent liquid crystal flow preventing portions are spaced apart from each other by a distance in the second direction, and end portions of the adjacent liquid crystal flow preventing portions overlap with each other at a center area of the polarizing liquid crystal panel.

5. The polarizing liquid crystal panel of claim 1, further comprising a plurality of elongated liquid crystal flow preventing portions in the cell gap and arranged in the second direction, each of the plurality of liquid crystal flow preventing portions disposed between adjacent driving units among the plurality of driving units of the polarizing liquid crystal panel.

6. The polarizing liquid crystal panel of claim 1, wherein
the second electrode comprises a plurality of segment electrodes each defining a driving unit among the plurality of driving units of the polarizing liquid crystal panel, and
the elongated liquid crystal flow preventing portion in the cell gap is between adjacent segment electrodes among the plurality of the segment electrodes.

7. The polarizing liquid crystal panel of claim 1, wherein a height of the liquid crystal flow preventing portion is substantially the same as the cell gap between the first substrate and the second substrate.

8. The polarizing liquid crystal panel of claim 1, wherein a height of the liquid crystal flow preventing portion is smaller than the cell gap between the first substrate and the second substrate.

9. The polarizing liquid crystal panel of claim 8, wherein the liquid crystal flow preventing portion further comprises:
a first flow preventing portion on the first substrate and spaced apart from the second substrate; and
a second flow preventing portion on the second substrate and spaced apart from the first substrate.

10. The polarizing liquid crystal panel of claim 9, further comprising a plurality of second flow preventing portions arranged in the second direction,
wherein in a plan view, the first flow preventing portion is between adjacent second flow preventing portions in the second direction.

11. The polarizing liquid crystal panel of claim 1, wherein the first electrode or the second electrode comprises a patterned electrode, the patterned electrode including a plurality of sub-electrodes.

12. The polarizing liquid crystal panel of claim 1, wherein
the first electrode is a patternless electrode on an entire of the first substrate, and
the second electrode is a patterned electrode including a plurality of sub-electrodes.

13. The polarizing liquid crystal panel of claim 2, wherein the plastic substrate comprises at least one selected from the group consisting of polycarbonate, triacetiyl cellulose and cyclic olefin copolymer.

14. A display apparatus comprising:
   a display panel which displays a stereoscopic image; and
   a polarizing liquid crystal panel on the display panel, the polarizing liquid crystal panel including:
      a first substrate including a first base substrate, a first alignment layer, and a first electrode between the first base substrate and the first alignment layer;
      a second substrate including a second base substrate, a second alignment layer, and a second electrode between the second base substrate and the second alignment layer, the second electrode defining a plurality of driving units of the polarizing liquid crystal panel, wherein the second substrate faces the first substrate;
      a spacer between the first substrate and the second substrate, wherein the spacer maintains a cell gap between the first substrate and the second substrate; and
      a liquid crystal flow preventing portion in the cell gap and between the first alignment layer and the second alignment layer,
   wherein
      the liquid crystal flow preventing portion is elongated in a first direction, and restricts movement of the spacer in a second direction which is substantially perpendicular to the first direction, and
      the elongated liquid crystal flow preventing portion in the cell gap is disposed between adjacent driving units among the plurality of driving units of the polarizing liquid crystal panel.

15. The display apparatus of claim 14,
   wherein the first substrate is between the display panel and the second substrate, and
   the second substrate further comprises a moisture resistant layer, the moisture resistant layer including an organic material.

16. The display apparatus of claim 14, further comprising polarizing glasses which receive an image which is passed through the polarizing liquid crystal panel, the polarizing glasses including a left eye part and a right eye part having different polarizing properties from each other.

* * * * *